(12) United States Patent
Stenton

(10) Patent No.: US 6,469,791 B1
(45) Date of Patent: Oct. 22, 2002

(54) MULTI-APERTURE HOLOGRAM FOR BACKWARDS TESTING OF OPTICAL SYSTEMS

(75) Inventor: Conrad Stenton, Midland (CA)

(73) Assignee: Raytheon Company, Lexington, MA (US)

( * ) Notice: Subject to any disclaimer, the term of this patent is extended or adjusted under 35 U.S.C. 154(b) by 163 days.

(21) Appl. No.: 09/617,371

(22) Filed: Jul. 17, 2000

(51) Int. Cl.$^7$ ............................................... G01B 9/021
(52) U.S. Cl. ....................................... 356/458; 356/515
(58) Field of Search ...................... 356/515, 512–514, 356/458, 521, 124; 359/15

(56) References Cited

U.S. PATENT DOCUMENTS 5,815,268 A * 9/1998 LaFleur ...................... 356/515

* cited by examiner

Primary Examiner—Samuel A. Turner
Assistant Examiner—Patrick Connolly
(74) Attorney, Agent, or Firm—William C. Schubert; Glenn H. Lanzen, Jr.

(57) ABSTRACT

An interferometric testing system and method employing a multiple-aperture hologram. In an illustrative embodiment, the inventive optical testing system includes an interferometer which outputs a planar light beam and analyzes a reflected selected light beam. A multiple-aperture hologram generates N image points in an image plane of the optical system responsive to the planar light beam. A retro-reflector reflects a selected one of N light beams corresponding to the N image points transmitted by the optical system back through the optical system to generate the selected light beam. According to one aspect of the present invention, the multiple-aperture hologram includes N apertures generating the N image points and one of the N apertures overlaps at least one other of the N apertures. According to another aspect of the invention, the multiple-aperture hologram intersects a plane perpendicular to an axis defined by the centers of the interferometer and the retro-reflector.

12 Claims, 3 Drawing Sheets

MULTI-APERTURE HOLOGRAM FOR BACKWARDS TESTING OF OPTICAL SYSTEMS

BACKGROUND OF THE INVENTION

1. Field of the Invention

The present invention relates to optical systems. More specifically, the present invention relates to systems and methods testing for optical systems.

2. Description of the Related Art

End-to-end interferometric testing of optical systems is problematic relative to the problem of testing the surface of an optical element. Interferometric testing can be performed from the object side of the optical system to the image side. To achieve end-to-end testing, a retro-reflective ball is typically placed in the image plane so that light traversing the optical system under test is reflected from the ball and returns to the interferometer. This test can be performed from the image side to the object side by focusing the interferometer at the image point and returning the beam with a plane mirror.

In many cases, it would be desirable to test the optical system from the image side rather than the object side.

In addition, current optical system testing does not generally rely on the results of a single test performed with respect to a single point source. On the contrary, it is currently common in the art to test optical systems with respect to a number of point sources.

There are generally two techniques for generating these point sources. The first is to physically lock the interferometer and a reference sphere, which generates the point source, with respect to one another. The interferometer-reference sphere combination is then moved to a series of predetermined locations relative to the optical system under test.

Alternatively, the reference sphere can be made to move to all the required "image points" to be tested. Yet another alternative involves the use of an array of lenses to generate a plurality of point sources.

One major problem with the latter technique is that the plurality of lenses needed to generate the multiple point sources physically interfere with one another, e.g., overlap, in fast systems.

What is needed is a system that facilitates testing of an optical system from the image side. More specifically, what is needed is a mechanism for generating multiple point sources of light to facilitate multipath testing of an optical system using an interferometer disposed in image space. Most specifically, what is needed is a mechanism for generating multiple point sources for testing of the optical system using an interferometer located in image space wherein each point source is generated without overlap in the optical elements of the mechanism. Ideally, the mechanism would permit optimization of the aperture generating each point source.

SUMMARY OF THE INVENTION

The need in the art is addressed by the system and method of the present invention. The inventive system is an interferometric testing system employing a multiple-aperture hologram. In an illustrative embodiment, the inventive optical testing system includes an interferometer which outputs a planar light beam and analyzes a reflected selected light beam. A multiple-aperture hologram generates N image points in an image plane of the optical system responsive to the planar light beam. A retro-reflector reflects a selected one of N light beams corresponding to the N image points transmitted by the optical system back through the optical system to generate the selected light beam.

According to one aspect of the present invention, the multiple-aperture hologram includes N apertures generating the N image points and one of the N apertures overlaps at least one other of the N apertures. According to another aspect of the invention, the multiple-aperture hologram intersects a plane perpendicular to an axis defined by the centers of the interferometer and the retro-reflector.

From an alternative perspective, the present invention provides an optical testing system that permits testing from the image side of the optical system under test. The inventive system includes a first device for generating a planar light beam and analyzing a selected light beam with respect to a reference light beam. A second device is included for generating the reference light beam. A third device is included for generating N image points in an image plane of an optical system responsive to the planar light beam. A fourth device is provided for reflecting a selected one of N light beams corresponding to the N image points transmitted by the optical system back through the optical system and thereby generate the selected light beam.

The optical testing system of the present invention advantageously provides an interferometric testing system which minimizes the need for system realignment between testing events with respect to individual point sources generated by the multiple-aperture hologram.

DESCRIPTION OF THE INVENTION

Illustrative embodiments and exemplary applications will now be described with reference to the accompanying drawing to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

As discussed above, conventional in-line holographic testing typically employs a single-aperture hologram interposed between an interferometer and a lens surface under test. This is illustrated with respect to FIG. 1 as discussed more fully below.

Figure 1:
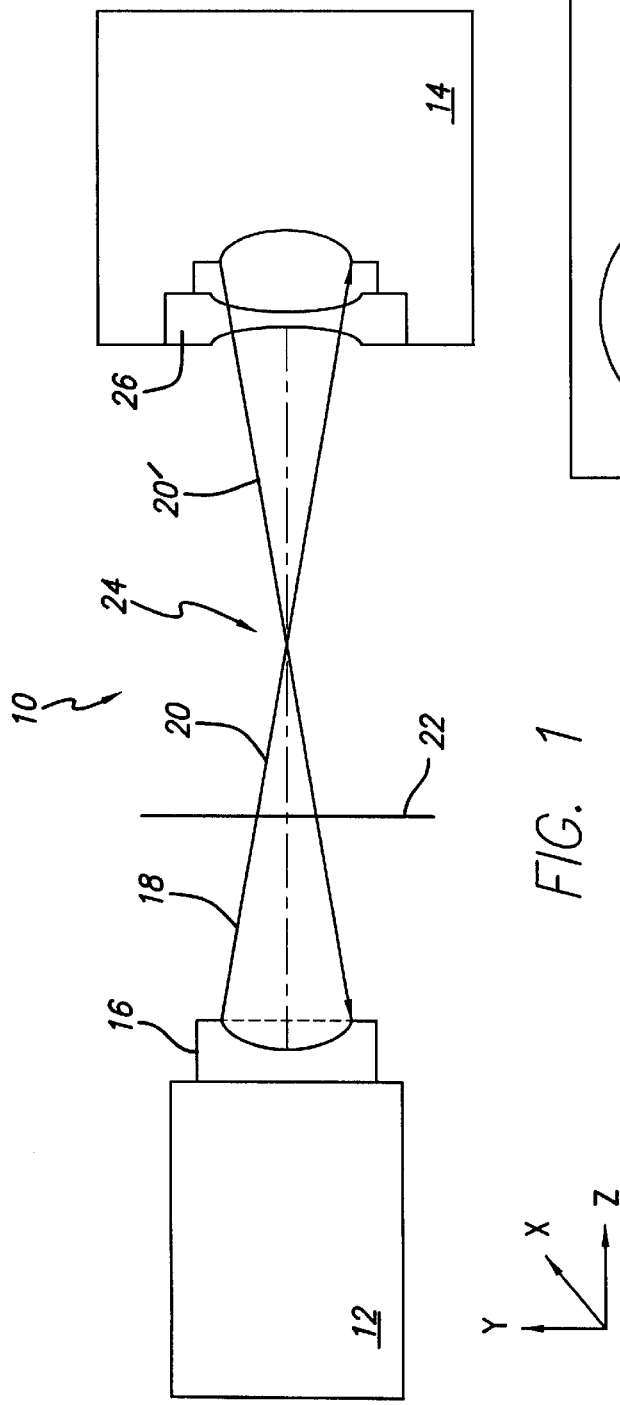
FIG. 1 is a schematic diagram of a interferometric test system constructed in accordance with conventional teachings.

FIG. 1 is a schematic diagram of an interferometric test system constructed in accordance with conventional teachings. FIG. 1 shows an apparatus 10 for testing aspherical lenses according to the conventional in-line hologram interferometric method. The apparatus 10 includes an interferometer 12 of a known type located opposite a lens holder 14. The lens holder 14 is aligned relative to the interferometer 12. A conventional interferometric reference sphere 16 is coupled to the interferometer 12 for shaping the wavefront of the radiation 18 emitted from the interferometer 12. The reference sphere 16 causes the radiation 18 emitted from the interferometer 12 to be shaped as a spherical beam 20. The spherical beam 20 passes through an in-line hologram 22, disposed between the interferometer 12 and the lens holder 14, and propagates toward the lens holder 14.

The hologram 22 is positioned at a preselected location with respect to the interferometer 12 as dictated by the test set-up using the hologram's own conventional positioning system (not shown). After passing through the hologram 22, the beam 20 converges to a focal point 24. From the focal point 24, the beam 20 diverges toward the lens holder 14 and a lens under test 26.

The hologram 22 creates a wavefront which, when the lens under test 26 is correctly positioned, reflects back through the hologram 22 and is converted back into a spherical wavefront. The wavefront includes all errors attributable to the lens under test 26. Those skilled in the art typically analyze these errors using an analysis system (not shown).

During testing, it is critical to correctly position the lens under test 26 with respect to the interferometer 12 in order to accurately and precisely reflect back the aspherical wavefront. The exact position for the lens under test 26 is often dictated by the characteristics of the hologram 22. To properly locate the lens under test 26, translational positioning of the lens must be performed in the X, Y and Z planes and rotational positioning of the lens must be performed in tip (about a horizontal axis) and tilt (about a vertical axis).

It will be appreciated that the apparatus 10, discussed above, tests only the surface of only one lens under test 26 and can not be used to perform end-to-end testing of an entire optical system. Even if the apparatus 10 could be employed to evaluate the performance of an optical system under test, such testing would require that both the interferometer 12 and the hologram 22 be moved to various off-axis positions so that the performance of the optical system can be evaluated with respect to multiple point sources. Accordingly, the point source generated by the interferometer-hologram combination would have to be positioned at a plurality of predetermined points around the axis of the optical system, e.g., the axis of the lens under test 26.

Moreover, it will be appreciated that the lens holder 14 would have to be replaced by a lens holding device and a retro-reflector of some sort to permit the light transmitted through the system under test to be reflected back though the hologram 22.

In short, either the system under test would remain stationary and all components of the test system would have to move relative to the system under test or the system under test would move relative to the point source generated by the hologram 22. In either case, the test system would simply require too many moving parts. Thus, a robust test system for end-to-end testing of optical system would not appear to be possible using conventional teachings.

As mentioned above, an alternative test system configuration is conceivable wherein multiple point sources are generated by multiple optical elements. However, as mentioned above and as will be discussed more fully below, the apertures of these multiple optical elements either would probably interfere or will be limited in size. Although it will be appreciated that a single, relatively large optical element could be moved in the plane occupied by the hologram in order to generate the required multiple point sources of light, such a test system would require at least an accurate positioning system and would require a large-volume cavity in which the optical element could move.

The multiple-aperture hologram testing system according to the present invention advantageously is capable of end-to-end testing of a multi-component optical system while employing a relatively compact and robust structure. Moreover, unlike the conventional holographic interferometer, the present invention tests the entire optical system. The multiple-aperture hologram test system according to the present invention evaluates the system under test from the image side of the system under test instead of the object side.

A hologram is placed near the image plane of an optical system and illuminated with a plane wave to create a number of "image point" sources. Light from the image point sources travels through the optical system from image to object space. A planar retro-reflector disposed at the appropriate angle returns the light to the optical system under test and back through the hologram to the interferometer for analysis.

It will be appreciated that a number of planar retro-reflectors can be used or one planar retro-reflector advantageously can be moved to the proper angles to illuminate the "image points" applied to the optical system under test in succession.

Figure 2:
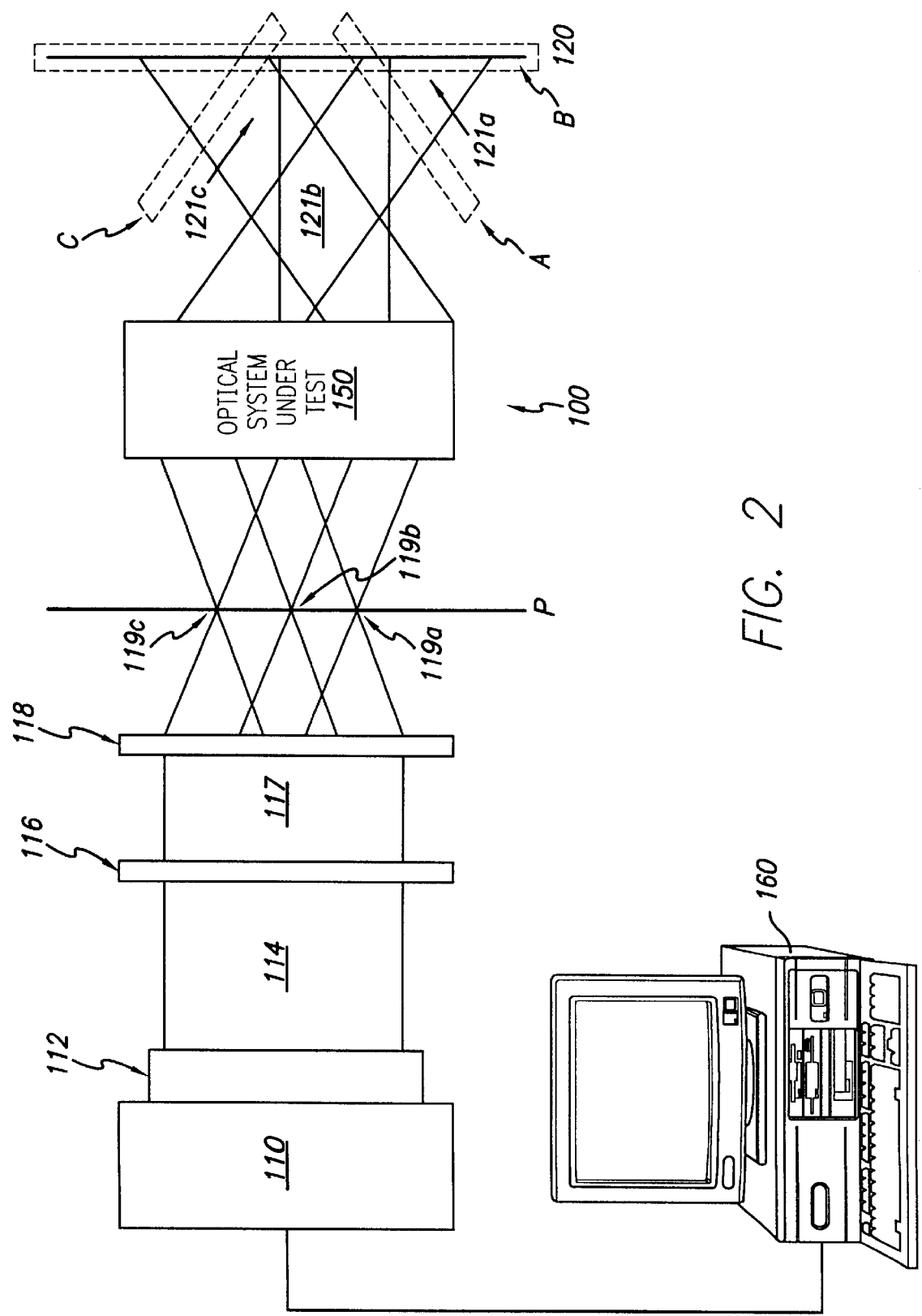
FIG. 2 is a schematic diagram of an optical testing system constructed in accordance with the teachings of the present invention.

FIG. 2 is a schematic diagram of an optical testing system 100 which includes a multi-aperture hologram 118 employed in the evaluation of an optical system under test 150 according to one preferred embodiment of the present invention. An interferometer 110 is provided with a reference reflector 112. The reference reflector 112 generates one of the light beams analyzed by the interferometer 110. Light reflected by the reference reflector 112 is approximately 4% of the light generated by the interferometer. It will be appreciated that since the interferometer expects equal strength beams. Since there is an abundance of light energy available in the beam striking the multiple-aperture hologram 118, i.e., the beam 117, the reflectivity of the reference reflector 112 should be adjusted to provide an optimized test wavefront back to the interferometer to ensure high fringe contrast and improved accuracy in measurement.

It will be appreciated that the optical radiation output from the interferometer 10 produces a single parallel or planar light beam 114. Preferably, the optical testing system 100 also includes a computer 160, which stores data generated by the interferometer 110, as will be discussed in greater detail below.

The beam 114 is transmitted to a helper lens 116, which generates a beam 117 applied to a multiple-aperture hologram 118. The helper lens 116 works in conjunction with the multiple-aperture hologram 118 to produce a multiple point hologram.

The incorporation of a holographic reference reflector 118' (not shown) would advantageously permit the user to confirm that the hologram is not tilted, i.e., that the surface thereof does not generate an interference pattern. Preferably, the reference reflector would be incorporated directly into the multiple-aperture hologram 118 to ensure the accuracy of alignment of the optical testing system 100.

As previously mentioned, the multiple-aperture hologram 118 generates multiple images points 119a, 119b, 119c, and etc., i.e., multiple pinpoints of light, in the image plane P of the optical testing system 100. Each of the image points 119a, 119b, 119c, etc., illuminates a predetermined portion of the optical system under test 150. This generates respective beams 121a, 121b, 121c, etc., at the object side of the optical system under test.

While each of the respective beams advantageously can be reflected by the retro-reflector 120 back to the optical system under test 150, the retro-reflector is aligned to selectively reflect only one of the beams propagated by the optical system under test. That is, the retro-reflector 120 is positioned (in tip and tilt) at positions A, B and C to selectively reflect the beams 121a, 121b, and 121c, respectively. Thus, the light impinging on the multiple-aperture hologram 118 travels to the retro-reflector 120 via the optical system under test 150 but only a selected portion of light returns to the multiple-aperture hologram 118 via the same optical path.

The multiple-aperture hologram 118 converts the beam, arriving from the optical system under test 150, back into a plane wave with system aberrations. This wave is analyzed by the interferometer 110.

Figure 3:
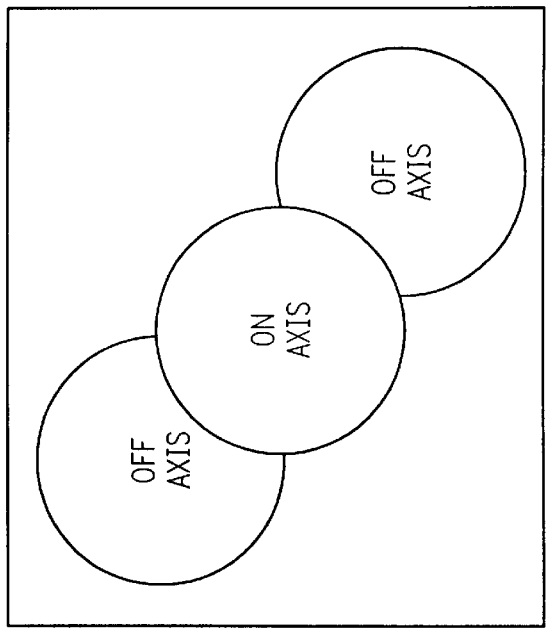
FIG. 3 illustrates three beams generated by multiple-aperture hologram 118 corresponding to the image points 119a, 119b, and 119c.

FIG. 3 illustrates three beams generated by multiple-aperture hologram 118 corresponding to the image points 119a, 119b, and 119c. It will be appreciated that the multiple apertures contained in the substrate of hologram 118 advantageously can overlap one another, since only one aperture of the multiple-aperture hologram will be selected as the active aperture when the optical testing system is in use, as discussed in greater detail below.

In FIG. 3, the axial beam, i.e., the beam corresponding to the image point 119b, is the selected beam, while the off-axis beams, i.e., the beams corresponding to image points 119a and 119c, are not selected. The portions of the off-axis apertures "hidden" by the on-axis aperture are not employed at the present time. Since the overlapping portions of the multiple apertures generated by the hologram 118 are employed in only one beam at a time, the overlap between the apertures will not produce artifacts in the beams. That is, the beams generated by the multiple-aperture hologram 118 are overlapping with respect to the interferometer 110. However, since the optical system under test 150 returns only one of the beams at any given time, there is no beam confusion at the interferometer 110.

It will be appreciated that since the each of the holograms in the multiple-aperture hologram share the aperture space with one or more other holograms, each aperture can be substantially larger than a conventional lens generating the same image point. It will also be appreciated that this larger aperture size translates to an improved accuracy for the optical testing system 100. Moreover, since all of the "lenses" of the multiple-aperture hologram 118 are contained in a single substrate, these "lenses" can be employed in an optical testing system where multiple lenses would exceed testing system size or weight design parameters.

Moreover, since all of the multiple apertures in the hologram 118 are supported by a single substrate, the optical testing system 100 advantageously can be made more robust, since supports for multiple lenses are not required. Advantageously, as mentioned above and discussed in greater detail below, the optical testing system can also be made more robust since complex elements for positioning one or both the interferometer 110 and the multiple-aperture hologram 118 are unnecessary to the optical testing system 100.

Thus, a first preferred embodiment of the present invention is an optical testing system, which advantageously can be employed in evaluating an optical system under test. The optical testing system includes an interferometer that outputs a planar light beam, a multiple-aperture hologram disposed between the interferometer and an image plane of the optical system under test, and a retro-reflector disposed on an object side of the optical system under test. Preferably, the interferometer is controlled by a computer system.

According to one aspect of the inventive optical testing system, the multiple-aperture hologram and the retro-reflector are fixed with respect to X, Y, and Z planes of the optical testing system. The multiple-aperture hologram cannot be rotated in tip and tilt. However, the retro-reflector 120 is pivotable in tip and tilt to permit selection of one of the N image points. The multiple-aperture hologram 118 and retro-reflector advantageously may be positioned by a variety of mechanical or electromechanical devices, all of which are considered to be within the scope of the present invention. Such devices are well known in the art, and any such device may be used provided that it accurately positions the multiple-aperture hologram and/or the retro-reflector 120 at the desired angle relative to the axis of the optical system under test.

It should be mentioned at this point that the retro-reflector 120 advantageously can be replaced by N planar retro-reflectors 120a, 120b, ... 120n, positioned to reflect the light associated with one of the image points 119a, 119b, 119c, ..., 119n, respectively. It will be noted that only one of the N planar retro-reflectors can be employed at any given time, since two or more retro-reflectors will generally create confusion at the interferometer 110.

Figure 4:
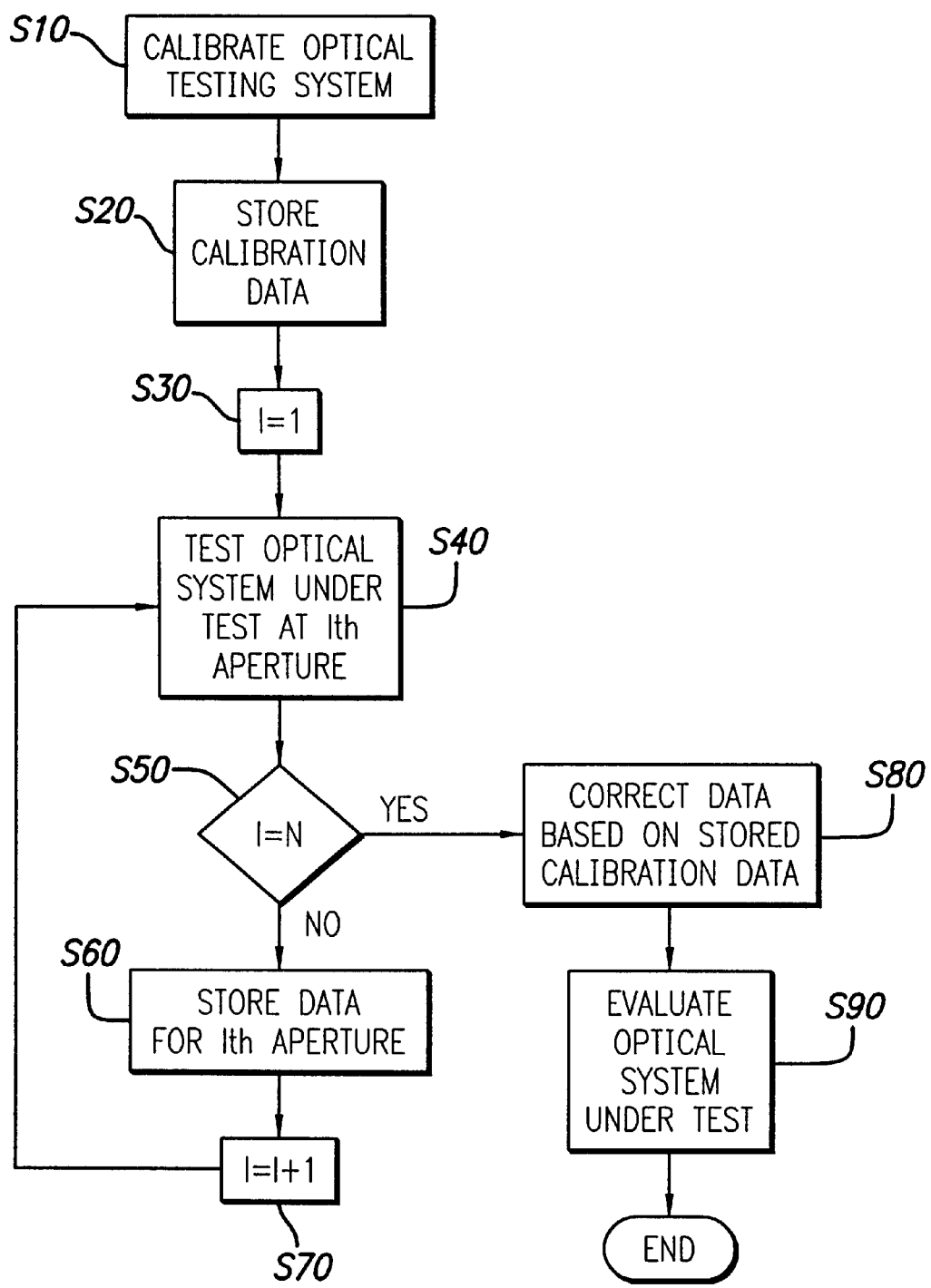
FIG. 4 is a flowchart delineating an exemplary method for operating the optical testing system illustrated in FIG. 2.

The operation of the optical testing system 100 employing a multiple-aperture hologram 118 according to the present invention will now be described with respect to FIG. 4, which illustrates a method for operating the optical testing system. During step S10, the optical testing system 100 is calibrated. Preferably, a calibration reference sphere is installed in place of the optical system under test 150 and the residual light passing through each aperture of the multiple-aperture hologram 118 is analyzed by the interferometer. The "calibration data" generated by the interferometer 110 during step S10 is stored in the computer 160 for later use during step S20.

After the optical testing system 100 has been calibrated, the system is initialized during step S30. In the exemplary case under discussion, the optical system under test 150 is installed in the optical testing system 100 and the aperture of the multi-aperture hologram 118 to be used in the first test run is selected. In this case, the on-axis beam corresponding to image point 119b is selected. During step S40, the optical system under test 150 is tested with respect to this image point. It will be appreciated that in this exemplary case, the retro-reflector 120 is positioned to reflect the beam corresponding to the selected image point back onto itself.

A check is then performed to determine whether or not the last of the N image points generated by the multiple-aperture hologram 118 has been tested at step S50. When the answer is negative, the data generated by the interferometer 110 for testing the $I^{th}$ aperture is stored in computer 160 during step S60 and then the optical testing system is reconfigured for the $I^{th}+1$ image point during step S70, i.e., the step labeled "I=I+1." It will be noted from the discussion above that another of the "I" image points, e.g., image point 119a, is selected by positioning the retro-reflector 120 so that only light corresponding to image point 119a is propagated in both directions through the optical system under test 150. Then, step S40 is repeated.

In the event that the determination at step S50 is affirmative, the data, including the data generated in the just performed step S40, is corrected based on the calibration data stored in the computer 160 during step S80. Then, the performance of the optical system under test 150 is evaluated during step S90. The method then ends.

It will be appreciated that any number of methodologies for evaluating the optical system under test are known to one of ordinary skill in the art and all of these evaluation methods are considered to fall within the scope of the above-described method for operating the optical testing system 100. Moreover, it will be appreciated that the steps S10 and S20 need not be repeated for each optical system under test 150 that is being evaluated. So long as the calibration data stored in the computer 160 is not expected to vary, another optical system under test can be evaluated using steps S30–S90.

Thus, the inventive method includes the steps of generating a planar light beam from an interferometer, passing the light beam through a multiple-aperture hologram to thereby generate multiple image points illuminating an optical system under test. The beam corresponding to a selected one of the image points is propagated through and then reflected back toward the interferometer from the object side of the optical system. The beam is then planarized by the selected aperture of the multiple-aperture hologram and applied to the interferometer 110. This allows the light traversing the optical system under test 150 to impinge on the interferometer to thereby form a phase map and/or contour map of the optical system under test.

As mentioned above, when viewed from the side of the multiple-aperture hologram closest to the interferometer 110, the apertures appear to overlap. However, since there is only one return beam selected at any given time, there is no problem with respect to confusion. As mentioned above, interferometer expects a return beam having the same intensity as the reference beam, i.e., roughly 4%. This leaves a lot of energy to share between the multiple apertures of the hologram. It should be noted that since the holograms share aperture space with each other, the aperture can be large compared with conventional lenses, thereby providing improved accuracy. Since all the apertures of the multiple-aperture hologram are contained on a single substrate, these "holographic lenses" can fit where conventional lenses cannot.

Thus, the present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A method of operating an optical testing system including a multiple-aperture hologram to thereby evaluate an optical system under test, the method comprising the steps of:

generating multiple beams, each of said beams creating one of said apertures of said multiple-aperture hologram, whereby each of the apertures overlap at least one other aperture;

selecting N image points in a predetermined pattern using the multiple-aperture hologram;

passing light corresponding to the N image points from the image side of the optical system under test to the object side;

reflecting light corresponding to a selected one of the N image points from the object side of the optical system under test to the image side; and analyzing the reflected light corresponding to the selected one of the N image points.

2. The method as recited in claim 1 further comprising the step of generating a planar light beam wherein the generating step comprises generating N image points in the predetermined pattern by applying the planar light beam to the multiple-aperture hologram.

3. The method as recited in claim 2 further comprising the step of sampling the planar light beam to thereby generate a reference light beam and wherein the analyzing step comprises the step of analyzing the reflected light corresponding to the selected one of the N image points with respect to the reference light beam.

4. The method as recited in claim 3 wherein the optical testing system includes an interferometer and the analyzing step is performed using the interferometer.

5. The method as recited in claim 1 wherein the generating step, the passing step, the reflecting step, and the analyzing step are repeated seriatim with respect to each of the N image points.

6. The method as recited in claim 1 wherein the multiple-aperture hologram is positioned to avoid generating an interference pattern.

7. An optical testing system for testing an optical system comprising:

an interferometer which outputs a planar light beam and analyzes a selected light beam;

a multiple-aperture hologram for generating N apertures with N image points in an image plane of the optical system responsive to the planar light beam, wherein one of the N apertures overlaps at least one other of the N apertures; and a retro-reflector which reflects a selected one of N light beams corresponding to the N image points transmitted by the optical system back through the optical system to thereby generate the selected light beam.

8. The optical testing system as recited in claim 7 further comprising a reference reflector disposed between the interferometer and the multiple-aperture hologram.

9. The optical testing system as recited in claim 8 wherein the reference reflector generates a reference light beam responsive to the planar light beam, and wherein the interferometer analyzes the selected light beam with respect to the reference light beam.

10. The optical testing system as recited in claim 7 wherein the multiple-aperture hologram intersects a plane perpendicular to an axis defined by the centers of the interferometer and the retro-reflector.

11. An optical testing system comprising:

first means for generating a planar light beam and analyzing a selected light beam with respect to a reference light beam;

second means for generating the reference light beam;

third means including a multiple-aperture hologram for generating N image points in an image plane of an optical system responsive to the planar light beam, said hologram comprising N apertures generating the N image points, wherein one of the N apertures overlaps at least one other of the N apertures; and fourth means for reflecting a selected one of N light beams corresponding to the N image points transmitted by the optical system back through the optical system to thereby generate the selected light beam.

12. The optical testing system as recited in claim 11 wherein the multiple-aperture hologram intersects a plane perpendicular to an axis defined by the centers of the first and fourth means.

* * * * *